United States Patent
Davis et al.

(10) Patent No.: US 6,433,127 B1
(45) Date of Patent: Aug. 13, 2002

(54) COPOLYESTERCARBONATES DERIVED FROM DIMER ACIDS AND METHOD FOR THEIR PREPARATION

(75) Inventors: Gary Charles Davis, Albany; David Paul Mobley, Niskayuna, both of NY (US); Mark Erik Nelson, Mt. Vernon, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/745,169

(22) Filed: Dec. 20, 2000

(51) Int. Cl.$^7$ ............................................... C08G 64/00
(52) U.S. Cl. ....................................... 528/196; 528/198
(58) Field of Search .................................. 528/196, 198

(56) References Cited

U.S. PATENT DOCUMENTS

| | | | | |
|---|---|---|---|---|
| 4,409,351 A | * | 10/1983 | Lee ............................. | 524/322 |
| 5,635,560 A | | 6/1997 | Köhler et al. ................. | 525/67 |

* cited by examiner

Primary Examiner—Terressa M. Boykin
(74) Attorney, Agent, or Firm—S. Bruce Brown; Noreen C. Johnson

(57) ABSTRACT

Copolyestercarbonates comprising carbonate structural units derived from at least one dihydroxyaromatic compound, preferably bisphenol A, and ester units derived from a dihydroxyaromatic compound and a composition comprising at least one $C_{36}$ dimer acid may be prepared by an interfacial phosgenation method conducted at a pH in the range of about 9–11. The copolyestercarbonates have properties which are often superior to those of corresponding polymers prepared, for example, from dodecanedioic acid.

30 Claims, No Drawings

COPOLYESTERCARBONATES DERIVED FROM DIMER ACIDS AND METHOD FOR THEIR PREPARATION

BACKGROUND OF THE INVENTION

This invention relates to copolyestercarbonates, and more particularly to polyestercarbonates containing a novel ester-derived unit.

Copolyestercarbonates may be prepared by the interfacially conducted condensation of dihydroxyaromatic compounds with dicarboxylic acids and phosgene in an immiscible aqueous-organic medium. The reaction ordinarily takes place in the presence of a tertiary amine, a phase transfer catalyst or both. They may also be prepared by a transesterification reaction between a diaryl carbonate such as diphenyl carbonate and a mixture of at least one dihydroxyaromatic compound and at least one aryl ester of a dicarboxylic acid. The product copolyestercarbonates have properties similar to those of polycarbonates but are generally more ductile, especially when the ester units are "soft block" units derived from aliphatic acids.

A class of widely used commercially available copolyestercarbonates comprises carbonate structural units derived from 2,2-bis(4-hydroxyphenyl)propane, hereinafter "bisphenol A", and ester units derived from a dicarboxylic acid containing at least 10 carbon atoms, particularly dodecanedioic acid (hereinafter "DDDA"). In order to effect complete incorporation of ester units in the copolymer, it is typically necessary to maintain the pH of an interfacial reaction mixture in the range of about 8.0–8.5 while dicarboxylic acid monomer is present therein. After all the acid has been incorporated, the pH is typically increased to a value in the range of about 9.0–10.5. The higher pH permits better pH control and minimizes the occurrence of such problems as phosgene buildup in the reactor and production of carbon dioxide by hydrolysis of carbonate salts, which can result in pressure buildup in the reactor.

For simplicity of operation, it would be desirable to employ a dicarboxylic acid which could be fully incorporated in the copolyestercarbonate at the same pH advantageously employed for incorporation of carbonate units; i.e., one in the range of about 9.0–10.5. This would permit conversion of a homopolycarbonate production system to copolyestercarbonate production with little or no change in procedure.

It is also sometimes found that the use of DDDA affords a polymer which is difficult to isolate, as by precipitation. The particles tend to stick together, forming lumps and making precipitation very cumbersome and complicated. This is particularly true at low molecular weights; for example, at weight average molecular weights (determined, for the most part, by gel permeation chromatography) below about 20,000.

Polymer mixtures comprising conventional polycarbonates or copolyestercarbonates and various branched dimeric fatty acid-derived polyesters are disclosed in U.S. Pat. No. 5,635,560. However, the fatty acid precursors therefor are described as containing phenolic OH groups. Moreover, there is no disclosure of copolyestercarbonates containing units derived from such fatty acids.

SUMMARY OF THE INVENTION

The present invention provides copolyestercarbonates having excellent physical properties. Said copolyestercarbonates may be produced by a relatively simple interfacial polymerization method, at a pH level within a single range for the entire reaction. The resulting copolyestercarbonates have properties which are equal to or, at certain molecular weight levels, superior to those of corresponding polymers prepared using DDDA.

One aspect of the invention is copolyestercarbonates comprising carbonate structural units of the formula

wherein each $A^1$ is independently a divalent aliphatic, alicyclic or aromatic radical, and ester units derived from a dihydroxyaromatic compound of the formula $A_1(OH)_2$ and a composition comprising at least one $C_{36}$ dimer acid.

Another aspect of the invention is a method for preparing a copolyestercarbonate which comprises passing phosgene through a mixture, in a two-phase aqueous-organic medium, of at least one dihydroxyaromatic composition comprising at least one $C_{36}$ dimer acid and at least one aliphatic tertiary amine, or phase transfer catalyst or mixture thereof, while maintaining the pH of the aqueous phase of said mixture in the range of about 9–11 by addition of aqueous alkali as necessary.

DETAILED DESCRIPTION; PREFERRED EMBODIMENTS

The copolyestercarbonates of the invention are characterized in part by the presence of carbonate structural units of formula I, in which $A^1$ may be a divalent aliphatic, alicyclic or aromatic radical or a mixture thereof. It is most often an aromatic radical, which may be an aromatic hydrocarbon or a substituted aromatic hydrocarbon radical, with illustrative substituents being alkyl, cycloalkyl, alkenyl (e.g., crosslinkable-graftable moieties such as allyl), halo (especially fluoro, chloro and/or bromo), nitro and alkoxy.

The preferred $A^1$ values have the formula $$-A^2-Y-A^3-, \qquad (II)$$

wherein each of $A^2$ and $A^3$ is a monocyclic divalent aromatic radical and Y is a single bond or a bridging radical in which one or two atoms separate $A^2$ from $A^3$. The free valence bonds in formula II are usually in the meta or para positions of $A^2$ and $A^3$ in relation to Y.

In formula II, the $A^2$ and $A^3$ values may be unsubstituted phenylene or substituted derivatives thereof wherein the substituents are as defined for $A^1$. Unsubstituted phenylene radicals are preferred, but it is also contemplated to employ, for example, polymers in which each of $A^2$ and $A^3$ has two methyl substituents in ortho positions to the free valence bond. Both $A^2$ and $A^3$ are preferably p-phenylene, although both may be o- or m-phenylene or one o- or m-phenylene and the other p-phenylene.

The bridging radical, Y, is one in which one or two atoms, preferably one, separate $A^2$ from $A^3$. It is most often a hydrocarbon radical and particularly a saturated $C_{1-2}$ aliphatic or alicyclic radical. Illustrative radicals are methylene, cyclohexylmethylene, [2.2.1] bicycloheptylmethylene, ethylene, ethylidene, 2,2-propylidene, 1,1-(2,2-dimethylpropylidene), phenylethylidene, cyclohexylidene, 3,3,5-trimethylcyclohexylidene, cyclopentadecylidene, cyclododecylidene, 9,9-fluorenylidene and 2,2-adamantylidene, especially an alkylidene radical. Aryl-substituted radicals are included, as are unsaturated radicals and radicals containing atoms other than carbon and hydrogen; e.g., oxy groups. Substituents such as those previously enumerated may be present on the aliphatic, alicyclic and aromatic portions of the Y group.

For most purposes, the preferred units containing moieties of formula II are those in which each of $A^2$ and $A^3$ is p-phenylene and Y is isopropylidene; i.e., those derived from bisphenol A. Such units may be present in combination with other units of formula II or formula I.

Also present in the copolyestercarbonates of this invention are ester units derived from a dihydroxyaromatic compound of the formula $A^1(OH)_2$ and a composition comprising at least one $C_{36}$ dimer acid. Dimer acid compositions are known in the art; reference is made, for example, to *Kirk-Othmer Encyclopedia of Chemical Technology*, Fourth Edition, 8, 223. They typically comprise principally dimers of $C_8$ unsaturated fatty acids such as oleic acid (cis-9-octadecenoic acid), elaidic acid (trans-9-octadecenoic acid), linoleic acid (cis-9-cis-12-octadecadienoic acid) or mixtures thereof, particularly naturally occurring mixtures such as tall oil fatty acids. The use of hydrogenated dimer acids is within the scope of the invention, and is often preferred.

The molecular structures of the acids present in dimer acid compositions (non-hydrogenated and hydrogenated) vary with the starting materials employed. They may include the following and their hydrogenated analogs:

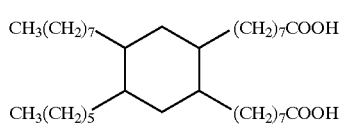
(III)

(IV)

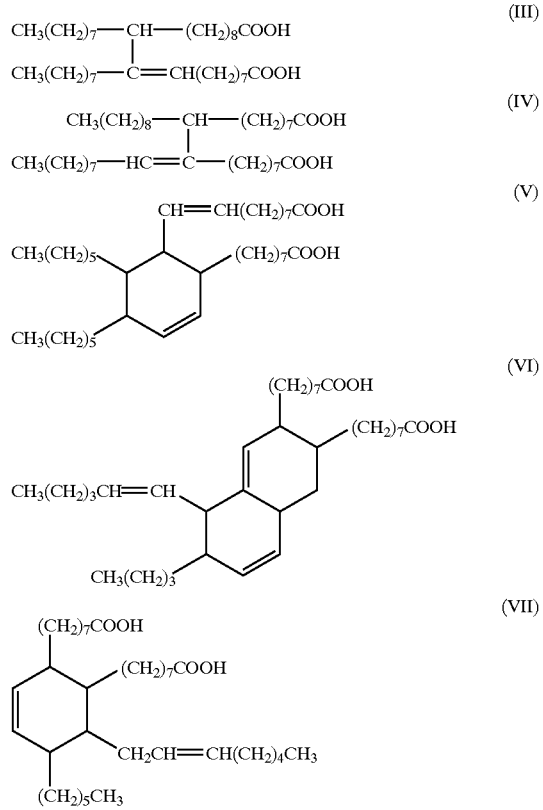
(V)

(VI)

(VII)

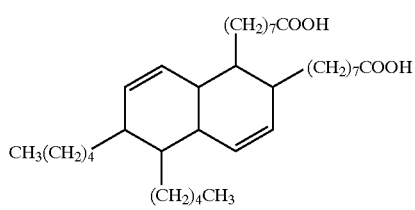
(VIII)

(IX)

Use of any dimer acid compositions comprising compounds of formulas III-IX or their hydrogenated analogs is particularly contemplated as part of the invention. Dimer acids are also identified by the CAS registry numbers 61788-89-4 and 68783-41-5, and any composition to which these numbers apply is useful according to the invention. It is further contemplated to employ dimer acid compositions in combination with other aliphatic dicarboxylic acids, such as DDDA.

In a preferred embodiment of the present invention the copolyestercarbonate is substantially linear. Many dimer acid compositions also contain minor proportions of $C_{54}$ trimer acids, which are tricarboxylic acids. To prepare substantially linear copolyestercarbonates, the level of trimer acids is preferably as low as possible since they may react to produce some minor proportion of branched polymer. If they are present, the level of trimer acids is preferably less than about 2%, more preferably less than about 1%.

The preferred composition for use according to the invention, in many instances, is a hydrogenated product commercially available from Unichema under the trade name PRIPOL 1009. It comprises about 98.5% by weight dimer acid, about 1% trimer acid and about 0.1% monocarboxylic acids, and particularly comprises the compound of formula IX. Cognis Corporation also provides dimer acid compositions which may be used, including some that are essentially identical to the products available from Unichema.

In one embodiment of the method of this invention, a two-phase aqueous-organic system containing at least one dihydroxyaromatic compound and the dimer acid composition is phosgenated. Water-immiscible organic solvents which may be employed as the organic constituent of the two-phase system include chlorinated aliphatic hydrocarbons, such as methylene chloride, chloroform, dichloroethane, trichloroethane, tetrachloroethane, dichloropropane and 1,2-dichloroethylene, and substituted aromatic hydrocarbons such as chlorobenzene, o-dichlorobenzene and the various chlorotoluenes. The chlorinated aliphatic hydrocarbons are preferred, with methylene chloride being most preferred.

Phosgenation may be conducted according to art-recognized interfacial procedures, employing a suitable interfacial polymerization catalyst which may be an aliphatic tertiary amine such as triethylamine, a heterocyclic tertiary amine such as 4-dimethylaminopyridine, or a phase transfer catalyst such as a tetraalkylammonium halide, a tetraalkylphosphonium halide or a hexaalkylguanidinium halide. Also present is an alkaline reagent, preferably sodium hydroxide, and optionally a chain termination agent such as phenol or p-cumylphenol.

The pH of the aqueous phase of the reaction mixture is maintained in the range of about 9.0–11, preferably about 9.0–10.5. More preferably, it is in the range of about 9.0–10.0 in initial stages and is then raised to a higher value up to about 10.5, typically after about 60–75% by weight of the total phosgene has been introduced. At early stage values above about 10.0, there is an increased tendency toward the formation of anhydrides from the dimer acid, which can degrade stability of the copolyestercarbonate.

In the interfacial reaction mixture, the volume ratio of organic liquid to water is generally in the range of about 1–3:1. The proportions of dimer acid are most often in the ranges of about 0.5–25 mole percent and preferably about 1–10 mole percent, based on the total of dihydroxyaromatic compound and dimer acid. The proportions of catalyst are most often in the ranges of about 1–10 mole percent, preferably about 1.5–5 mole percent, and more preferably about 1.5–3 mole percent, based on the total of dihydroxyaromatic compound and dimer acid. The proportions of chain termination agent (when employed) are most often in the ranges of about 0.5–6.0 mole percent, based on the total of dihydroxyaromatic compound and dimer acid. Since the dihydroxyaromatic compound and dimer acid composition are incorporated in the polymer in substantially stoichiometric quantities, the proportion of ester units in the copolyestercarbonate of the invention is also usually in the range of about 0.5–25 mole percent. The total molar ratio of phosgene to total dihydroxyaromatic compound and dimer acid is most often in the range of about 1.05–1.5. Typical reaction temperatures are in the range of about 10–50° C., preferably about 25–40° C.

Following interfacial preparation, the copolyestercarbonate is present in the organic phase and may be worked up by conventional methods. These may include such operations as washing and isolation by non-solvent precipitation, steam precipitation or boiling water precipitation.

The copolyestercarbonates of the invention may also be prepared by a transesterification (melt) procedure. Such a procedure employs a dialkyl carbonate such as diphenyl carbonate, a dihydroxyaromatic compound and an ester, most often a phenyl ester, of the dimer acid composition.

Typical weight average molecular weights, as determined by gel permeation chromatography, for the copolyestercarbonates of the invention are in the range of about 5,000–100,000, and preferably about 15,000–50,000.

The preparation of copolyestercarbonates by the method of the invention is illustrated by the following non-limiting examples:

EXAMPLES 1–3

In each example, a 500 milliliter (ml) Morton flask was charged with 29.4 grams (g) (130 millimoles [mmol]) of bisphenol A, 7.92 g (14.3 mmol, 10 mole percent based on total bisphenol A and dimer acid) of PRIPOL 1009 dimer acid, 1.37 g (6.5 mmol) of p-cumylphenol, 120 ml of methylene chloride, 67 ml of distilled water and 360 microliters ($\mu$l) of triethylamine. Sodium hydroxide (50% by weight aqueous), 2.5 g, was added and the mixture was stirred for 3 minutes. Phosgene, 10.12 g (10.12 mmol), was introduced at a rate of 0.5 g/min while the pH of the aqueous phase was maintained at a set value by addition of sodium hydroxide solution as necessary. When addition of this portion of phosgene was complete, the pH was raised to 10.5 over 3 minutes and an additional 7.20 g of phosgene (total 163.8 mmol) was introduced at the same rate. The organic phase was separated and washed with aqueous hydrochloric acid and distilled water. The desired copolyestercarbonate was precipitated by pouring the solution into 750 ml of boiling water, washed with water and vacuum dried overnight. It was analyzed by proton nuclear magnetic resonance spectroscopy to determine the level of acid incorporation and the proportion of anhydride groups.

The results are given in Table I, in comparison with Controls 1–12 in which the dimer acid was replaced by sebacic acid ("$C_{10}$"), DDDA ("$C_{12}$"), hexadecanedioic acid ("$C_{16}$") and stearic acid ("$C_{18}$")

TABLE I

| Example | Diacid | pH | Diacid incorporation, mole % | Anhydride, % |
|---|---|---|---|---|
| 1 | Dimer acid | 9.5 | 10.0 | 0 |
| 2 | Dimer acid | 10.0 | 10.0 | 0 |
| 3 | Dimer acid | 10.5 | 10.0 | 17.5 |
| Control 1 | $C_{10}$ | 7.5 | 9.99 | 0 |
| Control 2 | $C_{10}$ | 8.0 | 9.56 | Trace |
| Control 3 | $C_{10}$ | 8.5 | 7.57 | 11.0 |
| Control 4 | $C_{10}$ | 9.0 | 6.07 | 33.0 |
| Control 5 | $C_{12}$ | 8.0 | 9.86 | 0 |
| Control 6 | $C_{12}$ | 8.5 | 9.85 | 0 |
| Control 7 | $C_{12}$ | 9.0 | 9.60 | 18.0 |
| Control 8 | $C_{16}$ | 8.0 | 9.94 | 0 |
| Control 9 | $C_{16}$ | 8.5 | 10.0 | 0 |
| Control 10 | $C_{16}$ | 9.0 | 10.0 | 0 |
| Control 11 | $C_{16}$ | 9.5 | 9.51 | 7.8 |
| Control 12 | $C_{18}$ | 9.5 | 8.1 | 18.0 |

A comparison of Examples 1–3 with the controls demonstrates that with the use of dimer acid, it is possible to perform the initial stage of the 5 phosgenation at a pH of at least 9.5 without loss of ester units from the polymer. The same is not true of the lower dicarboxylic acids, many of which are not completely incorporated even at a pH as low as 9.0. It is also apparent that a final pH of 10.5 results in a substantial proportion of anhydride linkages in the polymer.

EXAMPLES 4–6

In each example a 1,136 liter stirred reactor was charged with 189 liters of deionized water, 220 liters of methylene chloride, 90.7 kilograms of bisphenol A, 160 g of sodium gluconate (used as a sequestering agent for iron), 1064 ml of triethylamine and various proportions of p-cumylphenol (to produce polymers of targeted weight average molecular weight) and dimer acid. After the addition, the 15 monomer feed tank was rinsed with an additional 76 liters of methylene chloride. Aqueous sodium hydroxide solution (50% by weight), 3.8 liters, was added to the reactor and the contents were allowed to equilibrate for 5 minutes; the agitator was set to 85 rpm. Upon completion of the equilibration step, the reaction mixture was phosgenated sequentially (ramp) at rates of 90.7, 136.1 and 56.7 kg/min for 5,15 and 20 25 minutes, respectively. After the phosgenation was complete, the reaction mixture was checked for free bisphenol A; if any was detected, the mixture was rephosgenated with 0.45–0.91 kg phosgene and retested. The mixture was then sent to a centrifuge work-up tank at pH 9–10, washed and precipitated substantially as described for Examples 1–3. The precipitation behavior of each product was evaluated. 5 The results are given in Table II, in comparison with Controls 13–15 in which the dimer acid was replaced by DDDA.

TABLE II

| Example | Targeted mol. wt. | p-Cumylphenol, kg | Dicarboxylic acid, mole % | Precipitation behavior |
|---|---|---|---|---|
| 4 | 17,500 | 5.44 | 3.4 | Excellent |
| 5 | 22,500 | 4.35 | 3.4 | Excellent |
| 6 | 28,500 | 2.81 | 3.4 | Excellent |
| Control 13 | 17,500 | 5.44 | 4.3 | Difficult to precipitate |
| Control 14 | 22,500 | 4.35 | 4.3 | Erratic: lumps, sticking |
| Control 15 | 28,500 | 2.81 | 4.3 | Excellent |

It can be seen that the use of dimer acid affords copolyestercarbonates comparable, in general, to the use of DDDA but exhibiting better precipitation behavior. This difference in response to precipitation is not, so far as can be determined, a result of the variation in proportion of ester units.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention.

What is claimed is:

1. A copolyestercarbonate comprising carbonate structural units of the formula

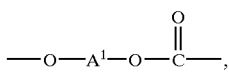

(I)

wherein each $A^1$ is independently a divalent aliphatic, alicyclic or aromatic radical, and ester units derived from a dihydroxyaromatic compound of the formula $A^1(OH)_2$ and at least one $C_{36}$ dimer acid.

2. The copolyestercarbonate according to claim 1 wherein $A^1$ has the formula

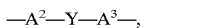

(II)

wherein each of $A^2$ and $A^3$ is a monocyclic divalent aromatic radical and Y is a single bond or a bridging radical in which one or two atoms separate $A^2$ from $A^3$.

3. The copolyestercarbonate according to claim 2 wherein the carbonate structural units are bisphenol A carbonate units.

4. The copolyestercarbonate according to claim 1 wherein the dimer acid composition is hydrogenated.

5. The copolyestercarbonate according to claim 1 wherein the ester units are derived from at least one acid having one of the following formulas or a hydrogenated analog thereof:

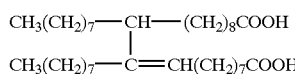

(III)

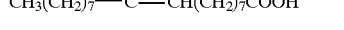

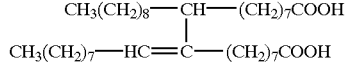

(IV)

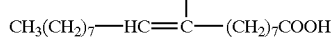

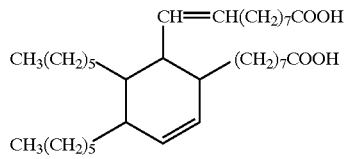

(V)

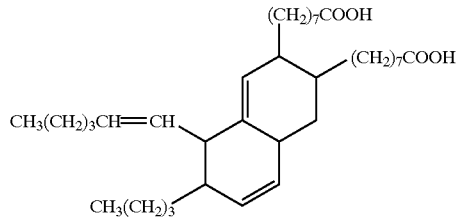

(VI)

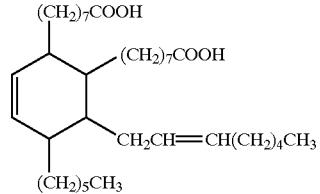

(VII)

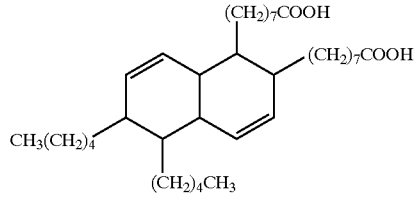

(VIII)

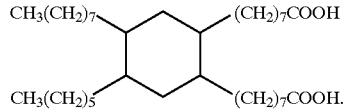

(IX)

6. The copolyestercarbonate according to claim 5 which comprises ester units derived from an acid of formula IX.

7. The copolyestercarbonate according to claim 1 wherein the dimer acid or mixture of dimer acids has the CAS registry number 68783-41-5.

8. The copolyestercarbonate according to claim 1 wherein the dimer acid or mixture of dimer acids has the CAS registry number 61788-89-4.

9. The copolyestercarbonate according to claim 1 which has a weight average molecular weight, as determined by gel permeation chromatography, in the range of about 5,000–100,000.

10. The copolyestercarbonate according to claim 1 wherein the proportion of ester units is in the range of about 0.5–25 mole percent.

11. A copolyestercarbonate comprising bisphenol A carbonate structural units and ester units derived from bisphenol A and a $C_{36}$ dimer acid or mixture of dimer acids having the CAS registry number 68783-41-5, said ester units being present in the range of about 0.5–25 mole percent.

12. A copolyestercarbonate comprising bisphenol A carbonate structural units and ester units derived from bisphenol A and a $C_{36}$ dimer acid or mixture of dimer acids having the CAS registry number 61788-89-4, said ester units being present in the range of about 0.5–25 mole percent.

13. A method for preparing a copolyestercarbonate which comprises passing phosgene through a mixture, in a two-phase aqueous-organic medium, of at least one dihydroxyaromatic compound, at least one $C_{36}$ dimer acid and at least one aliphatic tertiary amine, or phase transfer catalyst or mixture thereof, while maintaining the pH of the aqueous phase of said mixture in the range of about 9–11 by addition of aqueous alkali as necessary.

14. The method according to claim 13 wherein the organic medium comprises a chlorinated aliphatic hydrocarbon.

15. The method according to claim 14 wherein the chlorinated aliphatic hydrocarbon is methylene chloride.

16. The method according to claim 13 wherein $A^1$ has the formula

     (II)

wherein each of $A^2$ and $A^3$ is a monocyclic divalent aromatic radical and Y is a single bond or a bridging radical in which one or two atoms separate $A^2$ from $A^3$.

17. The method according to claim 16 wherein the dihydroxyaromatic compound is bisphenol A.

18. The method according to claim 13 wherein the dimer acid is hydrogenated.

19. The method according to claim 13 wherein the dimer acid comprises at least one acid having one of the following formulas or a hydrogenated analog thereof:

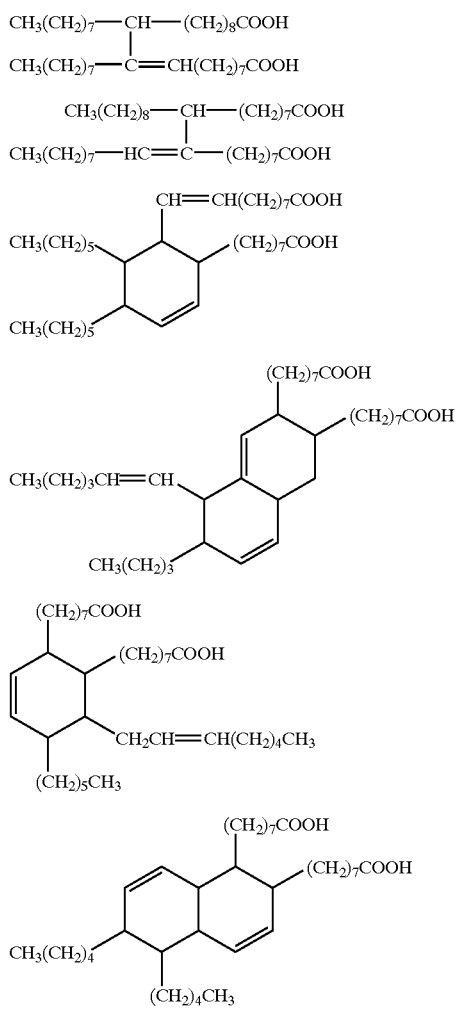

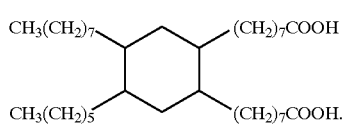

20. The method according to claim 19 wherein the dimer acid comprises the acid of formula IX.

21. The method according to claim 13 wherein the dimer acid or mixture of dimer acids has the CAS registry number 68783-41-5.

22. The method according to claim 13 wherein the dimer acid or mixture of dimer acids has the CAS registry number 61788-89-4.

23. The method according to claim 13 wherein the proportion of dimer acid is in the range of about 0.5–25 mole percent, based on the total of dihydroxyaromatic compound and dimer acid.

24. The method according to claim 13 wherein an aliphatic tertiary amine is employed.

25. The method according to claim 24 wherein the tertiary amine is triethylamine.

26. The method according to claim 13 wherein the alkali is sodium hydroxide.

27. The method according to claim 13 wherein the reaction temperature is in the range of about 10–50° C.

28. The method according to claim 13 wherein the pH is initially maintained in the range of about 9.0–10.0 and is raised to a higher value up to about 10.5 after about 60–75% by weight of the total phosgene has been introduced.

29. A method for preparing a copolyestercarbonate which comprises passing phosgene through a mixture, in a two-phase aqueous-organic medium comprising water and methylene chloride, of bisphenol A, a $C_{36}$ dimer acid or mixture of dimer acids having the CAS registry number 68783-41-5 and triethylamine, while adding aqueous alkali to maintain the pH of the aqueous phase of said mixture in the range of about 9.0–10.0 in initial stages of the reaction and at a higher value up to about 10.5 after about 60–75% by weight of the total phosgene has been introduced.

30. A method for preparing a copolyestercarbonate which comprises passing phosgene through a mixture, in a two-phase aqueous-organic medium comprising water and methylene chloride, of bisphenol A, a $C_{36}$ dimer acid or mixture of dimer acids having the CAS registry number 61788-89-4 and triethylamine, while adding aqueous alkali to maintain the pH of the aqueous phase of said mixture in the range of about 9.0–10.0 in initial stages of the reaction and at a higher value up to about 10.5 after about 60–75% by weight of the total phosgene has been introduced.

* * * * *